United States Patent
Senechal et al.

(10) Patent No.: US 9,367,736 B1
(45) Date of Patent: Jun. 14, 2016

(54) TEXT DETECTION USING FEATURES ASSOCIATED WITH NEIGHBORING GLYPH PAIRS

(71) Applicant: Amazon Technologies, Inc., Seattle, WA (US)

(72) Inventors: Thibaud Senechal, Somerville, MA (US); Quan Wang, Quincy, MA (US); Daniel Makoto Willenson, Somerville, MA (US); Shuang Wu, Cambridge, MA (US); Yue Liu, Brighton, MA (US); Shiv Naga Prasad Vitaladevuni, Cambridge, MA (US); David Paul Ramos, Cambridge, MA (US); Qingfeng Yu, Belmont, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/842,125

(22) Filed: Sep. 1, 2015

(51) Int. Cl.
  *G06K 9/46* (2006.01)
  *G06K 9/00* (2006.01)
  *G06K 9/34* (2006.01)

(52) U.S. Cl.
  CPC ........ *G06K 9/00463* (2013.01); *G06K 9/00456* (2013.01); *G06K 9/344* (2013.01); *G06K 9/348* (2013.01); *G06K 9/4638* (2013.01); *G06K 9/4652* (2013.01); *G06K 2209/01* (2013.01)

(58) Field of Classification Search
  None
  See application file for complete search history.

(56) References Cited

U.S. PATENT DOCUMENTS

2010/0260420 A1* 10/2010 D'Agostino ........... G06K 9/344
382/176

OTHER PUBLICATIONS

Lluis Gomez et al., MSER-based Real-Time Text Detection and Tracking, 2014 International Conference on Pattern Recognition, 2014, pp. 1-6.
Le Kang et al., Orientation Robust Text Line Detection in Natural Images, CVPR2014 paper, 2014, pp. 1-8.
Cong Yao et al., A Unified Framework for Multi-Oriented Text Detection and Recognition, IEEE Transactions of Image Processing, 2014, pp. 1-12.

* cited by examiner

*Primary Examiner* — Stephen R Koziol
*Assistant Examiner* — Amandeep Saini
(74) *Attorney, Agent, or Firm* — Sutherland Asbill & Brennan LLP

(57) ABSTRACT

A multi-orientation text detection method and associated system is disclosed that utilizes orientation-variant glyph features to determine a text line in an image regardless of an orientation of the text line. Glyph features are determined for each glyph in an image with respect to a neighboring glyph. The glyph features are provided to a learned classifier that outputs a glyph pair score for each neighboring glyph pair. Each glyph pair score indicates a likelihood that the corresponding pair of neighboring glyphs form part of a same text line. The glyph pair scores are used to identify candidate text lines, which are then ranked to select a final set of text lines in the image.

20 Claims, 6 Drawing Sheets

TEXT DETECTION USING FEATURES ASSOCIATED WITH NEIGHBORING GLYPH PAIRS

BACKGROUND

An image captured by a camera or a scanned image of a physical document may include text characters as well as other non-text shapes or symbols. Various methods are known for detecting text in an image. These existing methods suffer from various drawbacks. Technical solutions that address at least some of these drawbacks are discussed herein.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
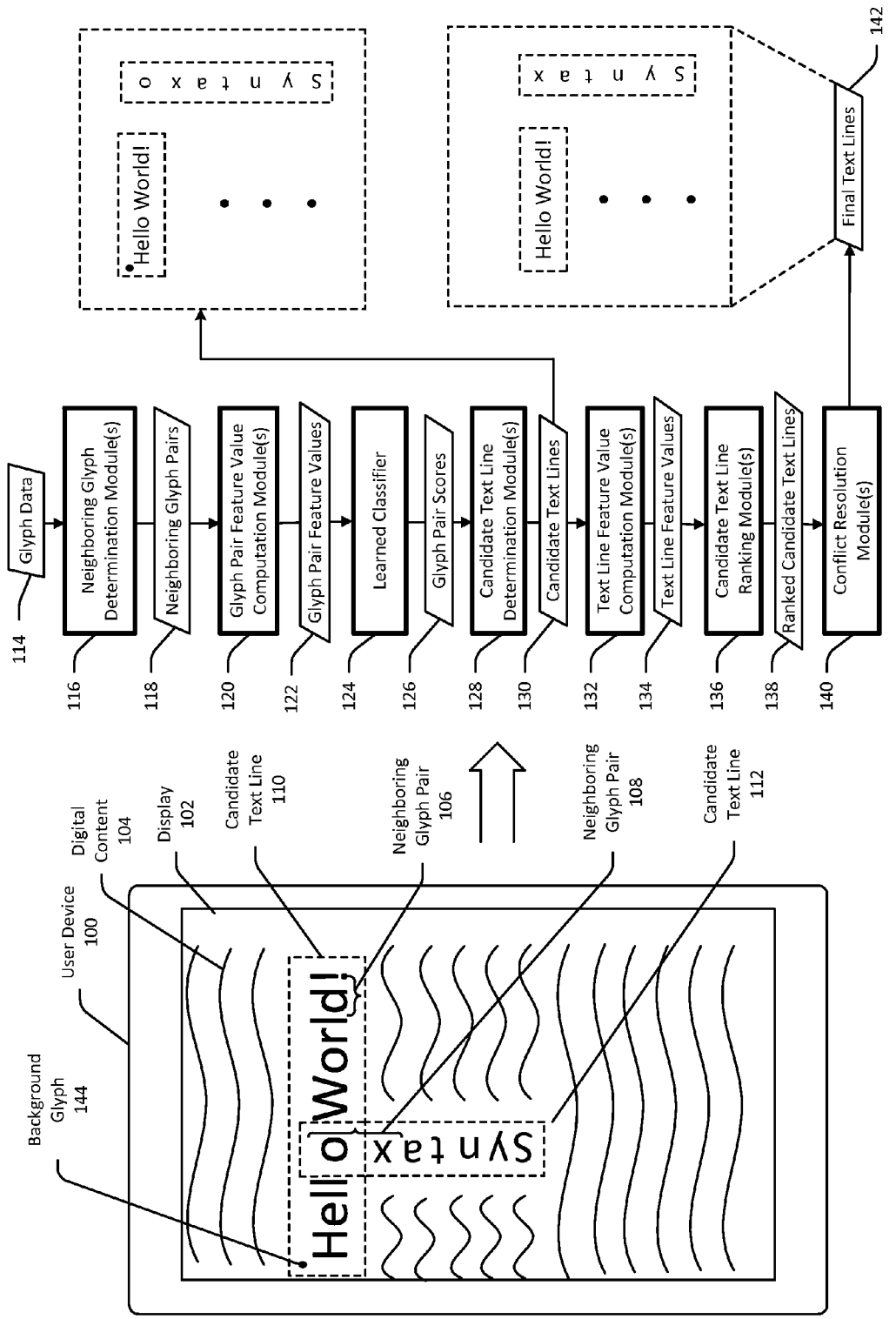
FIG. 1 is a schematic hybrid system and data flow diagram illustrating a multi-orientation text detection process in accordance with one or more example embodiments of the disclosure.

This disclosure relates to, among other things, systems, devices, methods, and computer-readable media for detecting text in an image, where the text may be oriented in different directions in the image. An image may include, for example, a still image captured by a camera, a video frame in a video stream captured by a video camera, a scanned image of a physical document, or the like. An example image may include, for example, certain text that is oriented in a horizontal direction in the image and/or certain text that is oriented in a vertical direction in the image. Horizontally oriented text and vertically oriented text may be rotated with respect to each other by 90 degrees. It should be appreciated that the terms "horizontal" and "vertical" (or variations thereof) are used herein merely to denote text having different (e.g., orthogonal) orientations and not to indicate an inherent characteristic of the text. In particular, whether a particular line of text in an image is deemed to be horizontally or vertically oriented may depend on the perspective of an observer of the image (e.g., an orientation of an observer with respect to the image). It should further be appreciated that text in an image may be oriented in any intermediate direction between a reference horizontal direction and a reference vertical direction (e.g., diagonally oriented). In addition, a line of text may be deemed to be horizontally oriented or vertically oriented even if each character in the line of text is not aligned along a reference horizontal axis or a reference vertical axis, whichever the case may be. For example, a particular character may be deemed to have the same orientation as another character even if one or both characters deviate from a reference line defining a reference orientation, as long as the deviation is within a permissible tolerance.

An image may include one or more glyphs. Each glyph may correspond to a particular group of image pixels in the image. More specifically, a glyph may be any symbol in an image that is represented by a group of connected image pixels. Each image pixel in the group may have a pixel value that differs from a pixel value of an image pixel forming part of a background portion of the image. The term connected may refer to each image pixel in the group being adjacent to at least one other image pixel in the group. For two-dimensional images, two image pixels may be adjacent if they share a common edge or corner. For three-dimensional images, two image pixels may be adjacent if they share a common edge, corner, or face. In certain example embodiments, each image pixel in a group of image pixels corresponding to a same glyph may have a respective pixel value that deviates from a pixel value of a background image pixel by more than a first threshold value and that is within a second threshold value of a respective pixel value of each other image pixel in the group. The range of pixel values within which a pixel value of an image pixel may fall may depend on the type of image (e.g., an 8-bit grayscale image may allow for 256 different pixel values while a 16-bit color image may allow for $2^{16}$ different pixel values).

A variety of text detection methods are known. For example, one category of text detection methods involves segmenting an image into groups of image pixels (e.g., glyphs) and merging multiple groups of image pixels into lines of text. First, learned or hard-coded rules are typically used to group glyphs into pairs, and then multiple pairs of glyphs are merged into text lines. These existing text detection methods suffer from various drawbacks. In particular, these existing methods either utilize only orientation-invariant glyph features or utilize orientation-variant glyph features but assume a particular text line orientation (e.g., a horizontal orientation).

Glyph features may include orientation-variant or orientation-invariant features. Example orientation-invariant features may include, for example, glyph color (e.g., pixel values of one or more image pixels representing the glyph), glyph stroke width, glyph convexity (e.g., a measure of the curvature of one or more portions of the glyph), glyph area (e.g., an area of a portion of an image occupied by a glyph), glyph perimeter (e.g., a perimeter of a bounding box that encompasses a glyph), and so forth. The values of orientation-invariant glyph features may remain unchanged regardless of the orientation of a line of text that includes the glyph. On the other hand, orientation-variant glyph features may include, for example, glyph height, glyph width, and so forth. Glyph height and glyph width may be orientation-variant features because the values of these glyph features may change depending on the orientation of a text line that includes the glyph. For example, a glyph height of a glyph in a horizontally oriented line of text may become a glyph width of the glyph if the glyph forms part of vertically oriented line of text, and vice versa. Similarly, a glyph width of a glyph in a horizontally oriented line of text may become a glyph height of a glyph in a vertically oriented line of text.

Existing text detection methods that utilize only orientation-invariant glyph features ignore orientation-variant glyph features such as glyph height and glyph width that may prove more beneficial than orientation-invariant features for accurately determining the glyph composition of text lines. Further, as noted earlier, existing text detection methods that utilize orientation-invariant features necessarily assume a particular text orientation (e.g., a horizontal orientation), and thus, may fail to identify text lines having a different orientation (e.g., a vertical orientation) than the assumed orientation.

Example embodiments of the disclosure relate to systems, devices, methods, and computer-readable media that utilize a multi-orientation text detection algorithm that addresses the drawbacks noted above with respect to existing text detection methods. In particular, a multi-orientation text detection algorithmic process in accordance with example embodiments of the disclosure is capable of utilizing orientation-variant glyph features to determine text lines in an image that may be orientated in any direction.

FIG. 1 is a schematic hybrid system and data flow diagram illustrating a multi-orientation text detection process in accordance with one or more example embodiments of the disclosure. An illustrative user device 100 is depicted in FIG. 1. The user device 100 may be any suitable device capable of rendering or causing digital content 104 to be rendered including, without limitation, a personal computer, a laptop computer, a smartphone, a tablet device, an electronic reader ("e-reader"), a personal digital assistant, a wearable computing device, or the like. The digital content 104 may be a still image captured by a camera, a video frame of a video stream, a scanned image of physical document, or any other suitable type of digital content. For ease of explanation, the digital content 104 may be referred to herein as an image 104. A camera, scanner, or other image capture device that captured the image 104 may be integrated with the user device 100 or may be a peripheral device that is configured to be operatively coupled to the user device 100. Alternatively, the image 104 may be obtained by the user device 100 from another device (e.g., received over a network communication link or a direct wired link).

The user device 100 may include a display 102 on which the image 104 may be rendered. The display 102 may be, for example, an electrophoretic display, an electrowetting display, a liquid crystal display (LCD), an organic light-emitting diode (OLED) display, or the like. The display 102 may be integrated with the user device 100 or may be a peripheral device (e.g., a display monitor) operatively coupled to the user device 100. The user device 100 may further include a touch sensor capable of detecting touch events. The touch sensor may be a resistive or a capacitive touch sensor. The user device 100 may be configured to control the display 102 to render the image 104 in response to touch events detected by the touch sensor.

The image 104 may include various glyphs. Each glyph may be a group of connected image pixels in the image 104. Each glyph may be a symbol in the image. The symbol may be a particular visual appearance of a text character or may be a non-text symbol such as a shape. A text character may be a group of image pixels that corresponds to a grapheme or a grapheme-like unit such as in an alphabet or syllabary in the written form of a natural language. Example text characters may include, without limitation, letters, numerical digits, punctuation marks, special characters (e.g., *, #, etc.), or the like.

FIG. 1 depicts an example data flow illustrating a multi-orientation text detection process in accordance with example embodiments of the disclosure. Program modules are depicted with a bolded boundary while input data received by a program module or output data generated by a program module are depicted as parallelograms. The program modules may include any suitable combination of software, hardware, and/or firmware. While a program module may be described herein as performing various processing or providing or otherwise supporting various functionality, it should be appreciated that such processing/functionality may be performed in response to execution of computer-executable instructions of the program module by one or more computer processors of the user device 100 and/or one or more computer processors of one or more remote servers.

While the multi-orientation text detection process may be described as being performed on the user device 100, it should be appreciated that any of the depicted program modules may reside on a remote server, with one or more program modules potentially distributed across multiple remote servers and/or across one or more remote servers and the user device 100. Thus, in certain example embodiments, any output data generated by any of the program modules may be transmitted from a remote server to the user device 100, or vice versa, for further processing by the receiving device such as, for example, for providing the received output data as input data to another program module. Further, in certain example embodiments, all of the depicted program modules may reside on one or more remote servers and the final output of the multi-orientation text detection process—a final set of text lines in the image 104—may be transmitted over one or more networks to the user device 104.

As an initial step in the process, glyph data 114 may be received by one or more neighboring glyph determination module(s) 116. The glyph data 114 may include position coordinates for each glyph that identify a location of the group of image pixels that correspond to the glyph within the image 104. The glyph data 114 may be generated using, for example, a Maximally Stable Extremal Regions algorithm.

Upon receipt of the glyph data 114, the neighboring glyph determination module(s) 116 may determine neighboring glyph pairs among the various glyphs in the image 104. Any of a variety of suitable approaches may be employed for determining a neighboring glyph pair. For example, for a pair of candidate neighboring glyphs including a first glyph and a second glyph, the neighboring glyph determination module(s) 116 may determine a first radius associated with the first glyph and a second radius associated with the second glyph. More specifically, the neighboring glyph determination module(s) 116 may determine a first bounding box that encompasses the first glyph and a second bounding box that encompasses the second glyph. A bounding box may be a group of boundary image pixels that forms a rectangular boundary such that each image pixel in a group of image pixels corresponding to a glyph is contained within the boundary. A bounding box having the smallest perimeter that still contains all of the image pixels of a glyph may be chosen.

A height and a width of the first bounding box and a height and a width of the second bounding box may then be determined. The height and the width of a bounding box associated with a glyph may differ based on an orientation defined by the glyph and a neighboring glyph. For example, the height value and the width value determined for the first boundary box may vary depending on whether the combination of the first glyph and the second glyph is horizontally oriented or vertically oriented. In certain example embodiments, the height and width values of the first bounding box (or the second bounding box) may be reversed if the first glyph and the second glyph are vertically oriented instead of horizontally oriented, or vice versa.

The neighboring glyph determination module(s) 116 may then determine a first radius associated with the first glyph and a second radius associated with the second glyph. The first radius may be a value that is proportional to at least one of the height or the width of the first bounding box. Similarly, the second radius may be a value that is proportional to at least one of the height or the width of the second bounding box. In certain example embodiments, the radius associated with a glyph may be equal to the greater of the height or the width of a bounding box associated with the glyph multiplied by a proportionality constant. As a non-limiting example, the first radius of the first glyph may be proportional to the height of the first glyph. The height of the first glyph may be a distance between two pixels of the first glyph that are located farthest from each other when the first glyph is projected onto an axis that is perpendicular to an axis defining an orientation of the pair of the first glyph and the second glyph. As a non-limiting example, the second radius of the second glyph may be similarly determined.

The neighboring glyph determination module(s) 116 may then determine a glyph distance between the first glyph and the second glyph. The glyph distance may be a distance between a center of the first glyph and a center of the second glyph. In certain example embodiments, a first set of one or more image pixels representative of a center of the first glyph may be determined and a second set of one or more image pixels representative of a center of the second glyph may be determined. An average distance between the first set of pixel(s) and the second set of pixel(s) may then be determined as the glyph distance. In other example embodiments, the distance between the first glyph and the second glyph may be a minimum distance between any pixel of the first glyph and any pixel of the second glyph. This minimum distance may be computed by projecting each of the first glyph and the second glyph onto the axis defining an orientation of the first glyph and the second glyph.

The neighboring glyph determination module(s) 116 may then determine whether the glyph distance is within at least one of the first radius or the second radius. More specifically, the neighboring glyph determination module(s) 116 may determine whether the glyph distance is at least within the larger of the first radius or the second radius. If the neighboring glyph determination module(s) 116 determine that the glyph distance between the first glyph and the second glyph is within at least one of the first radius or the second radius, the first glyph and the second glyph may be determined to be a neighboring glyph pair.

Glyphs within a neighboring glyph pair may be oriented in any direction in the image 104. For example, FIG. 1 depicts an example neighboring glyph pair 106 in which the constituent glyphs are oriented in a horizontal direction and an example neighboring glyph pair 108 in which the constituent glyphs are oriented in a vertical direction. Further, in certain example embodiments, a glyph and a first neighboring glyph may be oriented in a first direction (e.g., a horizontal direction), while the glyph and a second neighboring glyph may be oriented in a second direction (e.g., a vertical direction). For example, the glyph pair 108 that includes the glyph 'o' and the glyph 'x' may be a first neighboring glyph pair that includes the glyph 'o' and the glyph pair <o, w> may be a second glyph pair that may also include the glyph 'o' but that is oriented in a different direction from the glyph pair 108. In addition, in certain example embodiments, multiple candidate neighboring glyphs, each of which is oriented in a same direction with respect to a glyph, may be located respective distances from the glyph that are each within the radius of the glyph. In such example embodiments, a candidate neighboring glyph that is the closest distance to the glyph may be selected as a neighboring glyph for the glyph.

The set of neighboring glyph pairs 118 identified by the neighboring glyph determination module(s) 116 may be provided as input to one or more glyph pair feature value computation module(s) 120. The glyph pair feature value computation module(s) 120 may determine values of one or more glyph pair features for each glyph in the image 104. More specifically, the glyph pair feature value computation module(s) 120 may determine one or more glyph pair feature values for each glyph with respect to each neighboring glyph that forms a glyph pair with the glyph. For example, assume that glyph A is associated with neighboring glyphs B and C. The glyph pair feature value computation module(s) 120 may determine a glyph height, a glyph width, a glyph color, a glyph convexity, a glyph distance, etc. for glyph A with respect to neighboring glyph B and may independently determine values of these glyph pair features for glyph A with respect to neighboring glyph C. As previously noted, a multi-orientation text detection process in accordance with example embodiments of the disclosure may determine values for orientation-variant glyph pair features such as glyph height and glyph width. If, for example, the neighboring glyph pair that includes glyph A and glyph B has a first orientation that differs from a second orientation of the neighboring glyph pair that includes glyph A and glyph C, then the glyph height and glyph width determined for glyph A with respect to glyph B may differ (e.g., may be reversed if the orientations are orthogonal to each other) from the glyph height and glyph width determined for glyph A with respect to glyph C.

The glyph pair feature values 122 determined for each glyph in the image 104 with respect to each of its neighboring glyphs (regardless of orientation) may be provided as input to a learned classifier 124. The learned classifier 124 may include one or more machine learning modules configured to generate a glyph pair score 126 for each pair of neighboring glyphs based at least in part on the glyph pair feature values that were determined for each glyph in the neighboring glyph pair with respect to the other glyph in the neighboring glyph pair.

The learned classifier 124 may be trained using a ground-truth dataset in which neighboring glyph pairs are labeled as either belonging to the same text line or not. For example, glyph pair feature values associated with each glyph in a neighboring glyph pair known to form part of the same text line in a ground-truth image may be provided as a positive sample to train the learned classifier 124. Conversely, glyph pair feature values associated with each glyph in a neighboring glyph pair known to not form part of the same text line in a ground-truth image may be provided as a negative sample to train the learned classifier 124. A neighboring glyph pair from the ground-truth image that is known to not form part of the same text line may include at least one non-character symbol (e.g., a background symbol in the ground-truth image).

Based on the sample dataset used to train the learned classifier 124, the learned classifier 124 may determine, using the corresponding glyph pair feature values 122, a glyph pair score for each pair of neighboring glyphs 118. The glyph pair score for each neighboring glyph pair 118 may be any suitable quantitative measure of the likelihood that the constituent glyphs of the neighboring glyph pair 118 form part of a same text line in the image 104. For example, the glyph pair score may be a probabilistic value or any other suitable normalized value.

One or more candidate text line determination module(s) 128 may then receive the glyph pair score 126 for each neighboring glyph pair as input. The candidate text line determination module(s) 128 may be configured to determine a set of candidate text lines based at least in part on the received glyph pair scores 126. In certain example embodiments, the candidate text line determination module(s) 128 may generate a data structure that represents each glyph and its relationship with neighboring glyph(s). For example, the candidate text line determination module(s) 128 may generate a graph that includes a plurality of nodes where each node is connected to at least one other node of the graph by a corresponding edge. Each node may represent a glyph in the image 104 and each edge connecting two nodes may represent the glyph pair score associated with a neighboring glyph pair represented by the two connected nodes. The length of each edge, for example, may be indicative of the glyph pair score determined for the neighboring glyph pair represented by the two nodes connected by the edge.

For a given selected glyph, the candidate text line determination module(s) 128 may then determine a neighboring glyph that forms part of a neighboring glyph pair with the selected glyph having a highest glyph pair score among all neighboring glyph pairs that include the selected glyph. For example, the candidate text line determination module(s) 128 may locate a first node in the graph corresponding to a selected glyph. The candidate text line determination module(s) 128 may then locate an edge in the graph that is connected to the first node and that represents the highest glyph pair score associated with the first node. The candidate text line determination module(s) 128 may then determine a second node in the graph that is connected to the first node via the located edge. The first node and the second node may represent a first glyph and a second glyph, respectively, forming part of a neighboring glyph pair having the highest associated glyph pair score among all neighboring glyph pairs that include the first glyph.

The candidate text line determination module(s) 128 may compare the glyph pair score associated with the neighboring glyph pair that includes the first glyph and the second glyph to one or more threshold values to determine whether the neighboring glyph pair is suitable for selection as a seed pair of glyphs for determining a corresponding candidate text line 130. For example, the candidate text line determination module(s) 128 may determine whether the glyph pair score satisfies a first threshold value and whether the glyph pair score satisfies a second threshold value greater than the first threshold value. The glyph pair score may be compared against the first threshold value to determine whether at least one of the first glyph or the second glyph is a background glyph in the image 104. If the glyph pair score satisfies the first threshold value, the candidate text line determination module(s) 128 may determine that neither the first glyph nor the second glyph is a background glyph.

Further, the glyph pair score may be compared against the second threshold value to determine whether the first glyph and the second glyph form a suitable neighboring glyph pair for determining a candidate text line 130. For example, the first glyph and the second glyph may constitute the first two glyphs in a text line, in which case, the first glyph may be a capitalized letter. In such a scenario, the first glyph and the second glyph may not form a suitable glyph pair for determining a candidate text line 130. This may be reflected by the glyph pair score associated with the first glyph and the second glyph not satisfying the second threshold value. As another example, the first glyph and the second glyph may constitute two neighboring glyphs, neither of which is an end glyph within a text line. In such a scenario, the first glyph and the second glyph may form a suitable glyph pair for determining a candidate text line 130, and this may be reflected by the corresponding glyph pair score satisfying the second threshold value. It should be appreciated that a first value may satisfy a second value is the first value is greater than or equal to a second value.

If the candidate text line determination module(s) 128 determine that the glyph pair score associated with the neighboring glyph pair that includes the first glyph and the second glyph satisfies one or more threshold values (e.g., the first threshold value and the second threshold value described above), the first glyph and the second glyph may be selected as a seed pair of glyphs for determining a corresponding candidate text line 130. The graph may then be traversed to identify each additional node that is representative of a corresponding glyph that is aligned in orientation with an orientation of the neighboring glyph pair that includes the first glyph and the second glyph. Each such additional node may be directly connected to the first node or the second node via a corresponding edge or may be indirectly connected to the first node or the second node via one or more intervening additional nodes and corresponding edges. The first glyph, the second glyph, and each additional glyph aligned in orientation with an orientation of the neighboring glyph pair that includes the first glyph and the second glyph may together be identified as a candidate text line.

The candidate text line determination module(s) 128 may repeat the above process for each glyph in the image 104 to obtain a set of candidate text lines 130. Each candidate text line 130 may have any orientation within the image 104 (e.g., a horizontal orientation, a vertical orientation, a diagonal orientation, etc.). Moreover, a particular glyph may occur in more than one candidate text line 130 including, for example, candidate text lines having different orientations. For example, as shown in FIG. 1, the glyph 'o' occurs in candidate text line 110 having a horizontal orientation and also occurs in candidate text line 112 having a vertical orientation. In addition, different seed pairs of neighboring glyphs may yield the same candidate text line 130, and conversely, the same seed pair of neighboring glyphs may occur in different candidate text lines. For example, the same seed pair of neighboring glyphs may result in a first candidate text line 130 that includes a particular glyph that is offset from one or more other glyphs in the first candidate text line 130 in a first direction and may also result in a second candidate text line 130 that does not include that particular glyph but instead includes a different glyph that is offset from one or more other glyphs in the second candidate text line 130 in an opposing direction.

The set of candidate text lines 130 determined by the candidate text line determination module(s) 128 may be provided to one or more text line feature value computation modules 132. The text line feature value computation module(s) 132 may determine value(s) of one or more text line features for each candidate text line. A text line feature value may include, without limitation, a number of glyphs included in a candidate text line (e.g., a length of the candidate text line); an average of a set of glyph pair scores, where each glyph pair score corresponds to a particular pair of neighboring glyph pairs in the candidate text line; a metric indicative of a curvature of a candidate text line; a metric indicative of a variance in individual glyph feature values associated with each glyph in the candidate text line (e.g., a variance in glyph height values for the constituent glyphs of the candidate text line where the glyph heights may be determined based on an orientation of the text line; a variance in glyph color; a variance in stroke width; etc.); and so forth.

The set of text line feature values 134 determined for each candidate text line may then be provided as input to one or more candidate text line ranking modules 136. The candidate text line ranking module(s) 136 may then rank the set of candidate text lines based at least in part on the set of text line feature values 134 determined for each candidate text line. More specifically, the candidate text line ranking module(s) 136 may generate a score for each candidate text line (e.g., a weighted combination of one or more text line feature values associated with the candidate text line) that indicates a likelihood that the candidate text line represents an actual text line in the image 104. The candidate text line ranking module(s) 136 may then rank the set of candidate text lines 130 in accordance with their respective scores.

The ranked set of candidate text lines 138 may then be provided to one or more conflict resolution module(s) 140. The conflict resolution module(s) 140 may resolve any conflicts that may exist between the candidate text lines. A conflict may exist if the same glyph is present in more than one distinct candidate text line. For a particular glyph, the conflict resolution module(s) 140 may determine the highest-ranked candidate text line in which the glyph appears and may then proceed to remove that glyph from each lower-ranked candidate text line in which it also appears. After removing duplication of a glyph from one or more lower-ranked candidate text lines, the candidate text line ranking module(s) may determine an updated ranking for each candidate text line that was modified. This process may proceed iteratively for each glyph that appears in more than one candidate text line until a final set of candidate text lines are obtained, each of which includes a unique combination of glyphs from the image 104. This final set of candidate text lines output by the multi-orientation text detection algorithm may be assumed to be a final set of actual text lines 142 in the image 104.

FIG. 1 depicts an example effect of the processing performed by the conflict resolution module(s) 140. For example, the candidate text line 110 may be ranked higher than the candidate text line 112. The conflict resolution module(s) 140 may determine that the glyph 'o' is present in both candidate text lines 110, 112. The conflict resolution module(s) 140 may then remove the glyph 'o' from the lower-ranked candidate text line 112 thereby resulting in final text lines, each of which includes a unique combination of glyphs. In certain example embodiments, after removal of the glyph 'o' from the candidate text line 112, the candidate text line 112 may be re-ranked. More specifically, a new set of text line features values may be determined for the modified candidate text line and a new score may be determined from the new set of text line features. The updated ranking of the modified candidate text line may be higher than the previous ranking of the unmodified candidate text line 112. This updated ranking may be higher, for example, than the ranking of another candidate text line that includes the glyph 'n' which, in turn, was previously higher than the ranking of the unmodified candidate text line 112. In this manner, the glyph 'n' may be determined to be part of the modified candidate text line and may be removed from the other candidate text line that includes the glyph 'n.' Similar determinations may be made with respect to other glyphs in the candidate text line 112, and the modified candidate text line may ultimately be determined to be an actual text line in the image.

In addition, in certain example embodiments, a candidate text line may include a background glyph. For example, the candidate text line 110 may include the background glyph 144. In particular, even if a neighboring glyph pair that includes the background glyph 144 is not chosen as a seed pair because the corresponding glyph pair score fails to satisfy a corresponding threshold value, the background glyph 144 may nonetheless be included in a candidate text line 130 that is identified using another seed pair of neighboring glyphs. In such example embodiments, the candidate text line ranking module(s) 136 may assign a lower ranking to the candidate text line 130 than to a candidate text line that includes all glyphs of the candidate text line 130 except for the background glyph 144, in which case, the candidate text line that excludes the background glyph 144 may be identified as an actual text line in the image 104.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes

Figure 2:
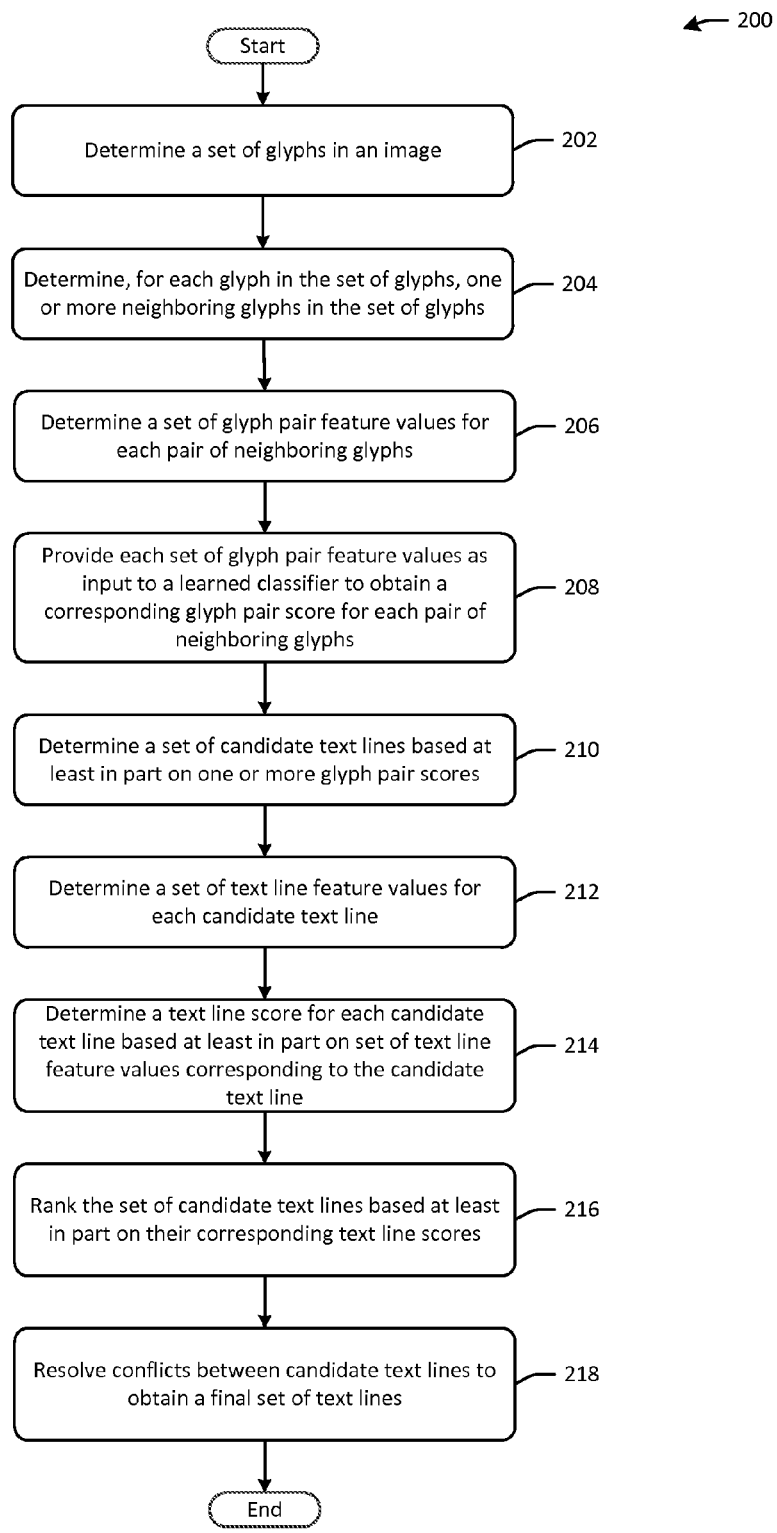
FIG. 2 is a process flow diagram of an illustrative multi-orientation text detection method for detecting a set of text lines in an image in accordance with one or more example embodiments of the disclosure.

FIG. 2 is a process flow diagram of an illustrative multi-orientation text detection method 200 for detecting a set of text lines in an image in accordance with one or more example embodiments of the disclosure.

At block 202, a set of glyphs in an image may be determined. More specifically, glyph data may be determined for each glyph in the set of glyphs. The glyph data may include, for example, position coordinates for each glyph that identify a location of the group of image pixels that correspond to the glyph within the image. The glyph data may be generated using, for example, a Maximally Stable Extremal Regions algorithm.

At block 204, an identification of the set of glyphs and the corresponding glyph data may be received by the neighboring glyph determination module(s) 116 which may proceed to determine neighboring glyph pairs among the various glyphs in the image. Any of the approaches previously described may be employed for determining a neighboring glyph pair. For example, the neighboring glyph determination module(s) 116 may determine a first radius associated with a first glyph and a second radius associated with a second glyph. As previously described, the first radius may be a value that is proportional to at least one of a height or a width of a bounding box associated with the first glyph. Similarly, the second radius may be value that is proportional to at least one of a height or a width of a bounding box associated with the second glyph.

The neighboring glyph determination module(s) 116 may then determine a glyph distance between the first glyph and the second glyph, and may further determine whether the glyph distance is within (e.g., less than or equal to) at least one of the first radius or the second radius. If the neighboring glyph determination module(s) 116 determine that the glyph distance is within the first radius and/or the second radius, the first glyph and the second may be determined to be a neighboring pair of glyphs. The neighboring glyph determination module(s) 116 may in this manner determine one or more neighboring glyphs for each glyph in the set of glyphs in the image.

Glyphs within a neighboring glyph pair may be oriented in any direction in the image. Further, in certain example embodiments, a glyph and a first neighboring glyph may be oriented in a first direction (e.g., a horizontal direction), while the glyph and a second neighboring glyph may be oriented in a second direction (e.g., a vertical direction). In addition, in certain example embodiments, multiple candidate neighboring glyphs, each of which is oriented in a same direction with respect to the glyph, may be within a radius associated with a glyph. In such example embodiments, the neighboring glyph determination module(s) 116 may select a candidate neighboring glyph that is the closest distance to the glyph as a neighboring glyph for the glyph.

At block 206, the glyph pair feature value computation module(s) 120 may receive the set of neighboring glyph pairs identified by the neighboring glyph determination module(s) 116 at block 204 and may determine values of one or more glyph pair features for each pair of neighboring glyphs in the image. More specifically, the glyph pair feature value computation module(s) 120 may determine one or more glyph pair feature values for each glyph with respect to each neighboring glyph pair that contains that glyph.

At block 208, the glyph pair feature values determined for each glyph in the image with respect to each of its neighboring glyphs (regardless of orientation) may be provided as input to a learned classifier 124. The learned classifier 124 may include one or more machine learning modules configured to generate a glyph pair score for each pair of neighboring glyphs based at least in part on the glyph pair feature values that were determined for each glyph in the neighboring glyph pair with respect to the other glyph in the neighboring glyph pair. More specifically, based on a sample dataset used to train the learned classifier 124, the learned classifier 124 may determine, using the corresponding glyph pair feature values, a glyph pair score for each pair of neighboring glyphs. The glyph pair score for each neighboring glyph pair may be any suitable quantitative measure of the likelihood that the constituent glyphs of the neighboring glyph pair form part of a same text line in the image.

At block 210, the candidate text line determination module(s) 128 may receive the glyph pair score for each neighboring glyph pair as input and may determine a set of candidate text lines based at least in part on the received glyph pair scores. In certain example embodiments, the candidate text line determination module(s) 128 may generate a data structure that represents each glyph and its relationship with neighboring glyph(s). As previously noted, in certain example embodiments, the candidate text line determination module(s) 128 may generate a graph that includes a plurality of nodes where each node is connected to at least one other node of the graph by a corresponding edge. Each node may represent a glyph in the image and each edge connecting two nodes may represent the glyph pair score corresponding to a neighboring glyph pair represented by the two connected nodes.

For a given selected glyph, the candidate text line determination module(s) 128 may locate a first node in the graph corresponding to a selected glyph. The candidate text line determination module(s) 128 may then locate an edge in the graph that is connected to the first node and that represents the highest glyph pair score associated with the first node. The candidate text line determination module(s) 128 may then determine a second node in the graph that is connected to the first node via the located edge. The first glyph and the second glyph may be selected as a seed pair of glyphs for determining a corresponding candidate text line. In certain example embodiments, the candidate text line determination module(s) 128 may first determine that the glyph pair score associated with the first glyph and the second glyph satisfies one or more threshold values prior to selecting the first glyph and the second glyph as a seed pair of glyphs.

The graph may then be traversed to identify each additional node that is representative of a corresponding glyph that is aligned in orientation with an orientation of the neighboring glyph pair that includes the first glyph pair and the second glyph pair. The first glyph, the second glyph, and each additional glyph aligned in orientation with an orientation of the neighboring glyph pair that includes the first glyph pair and the second glyph pair may together be identified as a candidate text line. The candidate text line determination module(s) 128 may repeat the above process for each glyph in the image to obtain a set of candidate text lines.

At block 212, the text line feature value computation module(s) 132 may receive the set of candidate text lines as input and may determine value(s) of one or more text line features for each candidate text line. As previously noted, a text line feature value may include, without limitation, a number of glyphs included in a candidate text line; an average of a set of glyph pair scores, where each glyph pair score corresponds to a particular pair of neighboring glyph pairs in the candidate text line; a metric indicative of a curvature of a candidate text line; a metric indicative of a variance in individual glyph feature values associated with each glyph in the candidate text line; and so forth.

The set of text line feature values determined for each candidate text line may then be provided as input to the candidate text line ranking module(s) 136. The candidate text line ranking module(s) 136 may then rank the set of candidate text lines based at least in part on the set of text line feature values determined for each candidate text line. More specifically, at block 214, the candidate text line ranking module(s) 136 may generate a text line score for each candidate text line (e.g., a weighted combination of one or more text line feature values associated with the candidate text line) that indicates a likelihood that the candidate text line represents an actual text line in the image. Then, at block 216, the candidate text line ranking module(s) 136 may rank the set of candidate text lines in accordance with their respective scores.

The ranked set of candidate text lines may then be provided to one or more conflict resolution module(s) 140. At block 218, the conflict resolution module(s) 140 may resolve any conflicts that may exist between the candidate text lines to obtain final set of text lines determined to correspond to actual text lines in the image. More specifically, for a particular glyph, the conflict resolution module(s) 140 may determine the highest-ranked candidate text line in which the glyph appears and may then proceed to remove that glyph from each lower-ranked candidate text line in which it also appears. After removing duplication of a glyph from one or more lower-ranked candidate text lines, the candidate text line ranking module(s) 136 may determine an updated ranking for each candidate text line that was modified. This process may proceed iteratively for each glyph that appears in more than one candidate text line until a final set of candidate text lines are obtained, each of which includes a unique combination of glyphs from the image 104.

Figure 3:
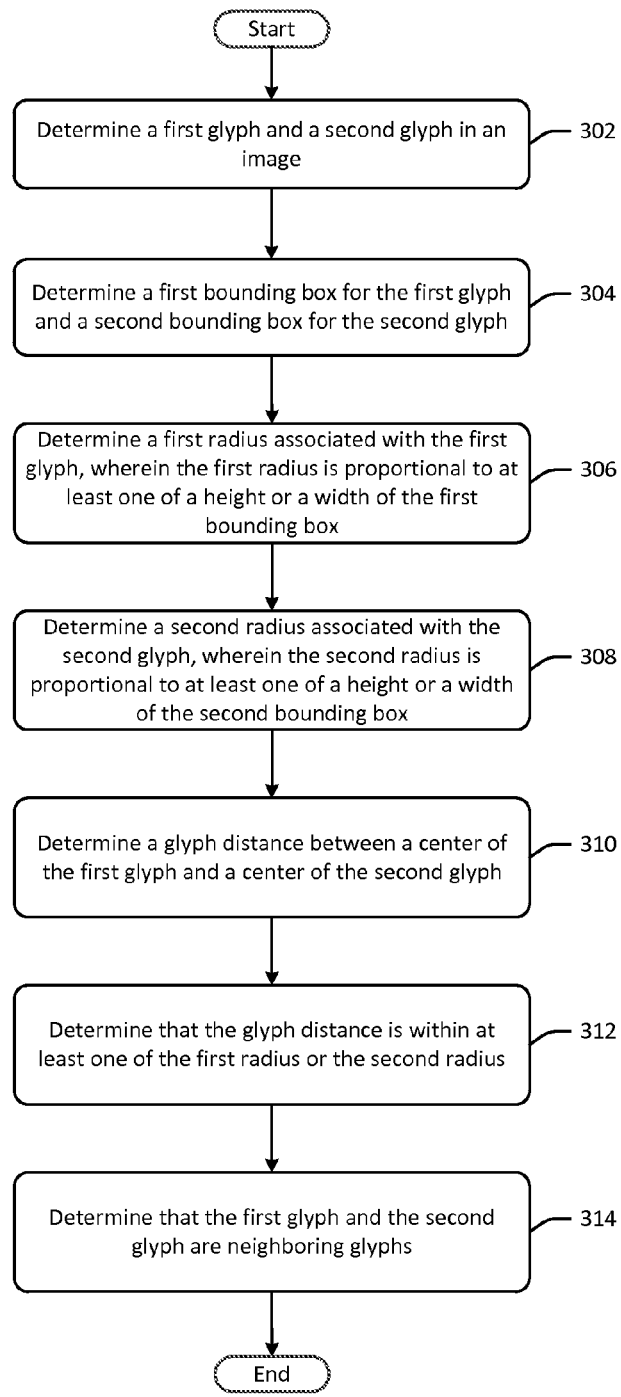
FIG. 3 is a process flow diagram of an illustrative method for determining a pair of neighboring glyphs in an image in accordance with one or more example embodiments of the disclosure.

FIG. 3 is a process flow diagram of an illustrative method 300 for determining a pair of neighboring glyphs in an image in accordance with one or more example embodiments of the disclosure.

At block 302, the neighboring glyph determination module(s) 116 may determine a first glyph and a second glyph in an image. At block 304, the neighboring glyph determination module(s) 116 may determine a first bounding box that encompasses the first glyph. The first bounding box may be a group of boundary image pixels that forms a rectangular boundary such that each image pixel in the group of image pixels corresponding to the first glyph is contained within the boundary. A bounding box having the smallest perimeter that still contains all of the image pixels of the first glyph may be chosen as the first bounding box. Similarly, the neighboring glyph determination module(s) 116 may determine a second bounding box that encompasses the second glyph.

At block 306, the neighboring glyph determination module(s) 116 may determine a first radius associated with the first glyph. More specifically, the neighboring glyph determination module(s) 116 may determine a height and a width of the first bounding box. The height and the width of the first bounding box may be determined with respect to the pairing of the first glyph and the second glyph. The first radius may be a value that is proportional to at least one of the height or the width of the first glyph. Similarly, the neighboring glyph determination module(s) 116 may determine, at block 308, a second radius associated with the second glyph. More specifically, the neighboring glyph determination module(s) 116 may determine a height and a width of the second bounding box. The second radius may be a value that is proportional to at least one of the height or the width of the second glyph.

At block 310, the neighboring glyph determination module(s) 116 may determine a glyph distance between the first glyph and the second glyph. In certain example embodiments, a first set of one or more image pixels representative of a center of the first glyph may be determined and a second set of one or more image pixels representative of a center of the second glyph may be determined. An average distance between the first set of pixel(s) and the second set of pixel(s) may then be determined as the glyph distance. At block 312, the neighboring glyph determination module(s) 116 may determine that the glyph distance is within at least one of the first radius or the second radius. More specifically, the neighboring glyph determination module(s) 116 may determine that the glyph distance is at least within the larger of the first radius or the second radius. Upon determining that the glyph distance between the first glyph and the second glyph is within at least one of the first radius or the second radius, the neighboring glyph determination module(s) 116 may determine that the first glyph and the second glyph are neighboring glyphs at block 314.

The method 300 may be repeated with respect to any two glyphs in the image to determine if they glyphs form part of a pair of neighboring glyphs. It should be appreciated that a pair of neighboring glyphs may be oriented in any direction within the image. Further, any given glyph may be oriented in a first direction (e.g., a horizontal direction) with respect to a first neighboring glyph and may be oriented in a second different direction (e.g., a vertical direction) with respect to a second neighboring glyph.

Figure 4:
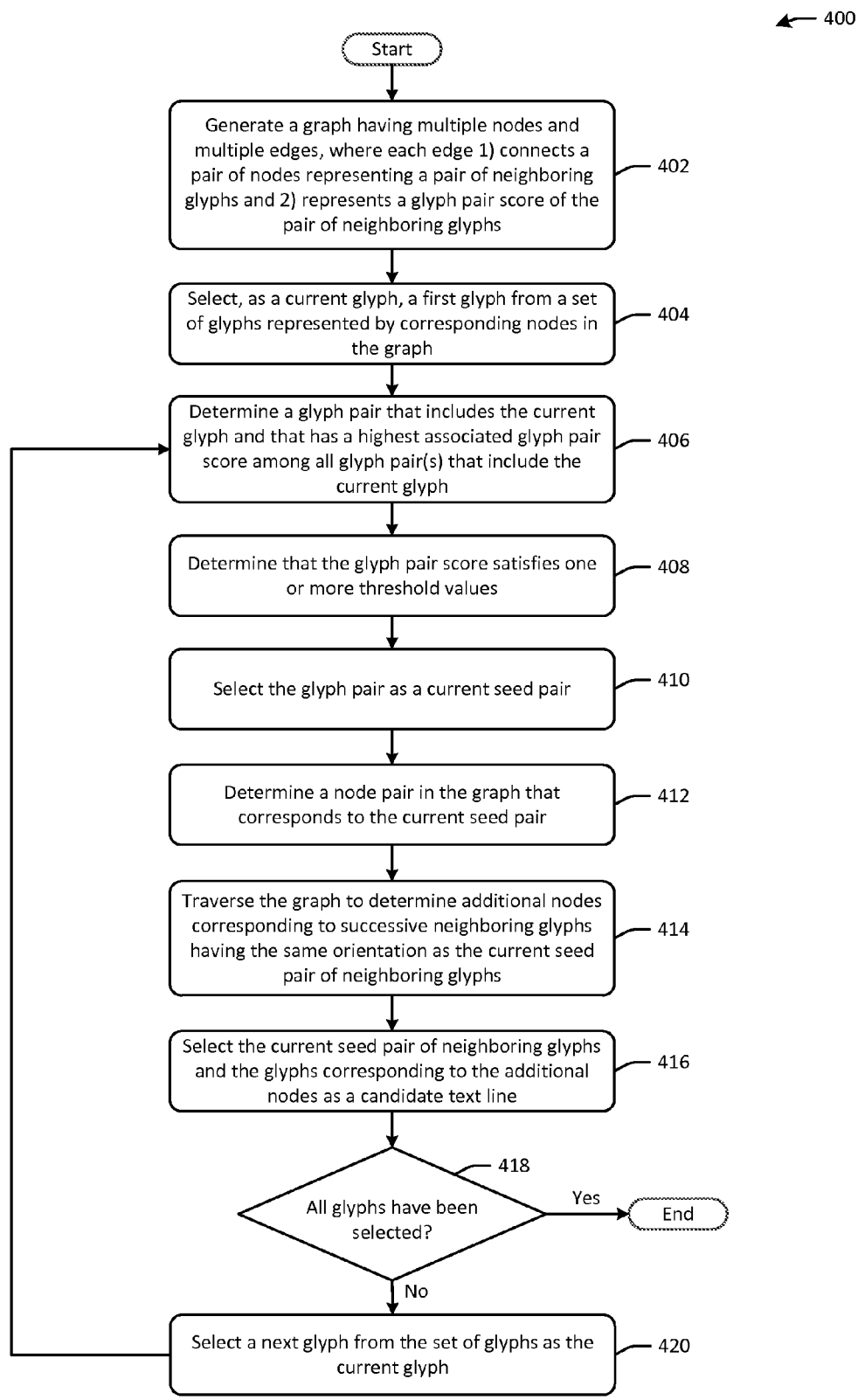
FIG. 4 is a process flow diagram of an illustrative method for determining a set of candidate text lines in an image in accordance with one or more example embodiments of the disclosure.

FIG. 4 is a process flow diagram of an illustrative method 400 for determining a set of candidate text lines in an image in accordance with one or more example embodiments of the disclosure.

At block 402, the candidate text line determination module(s) 128 may generate a graph that includes multiple nodes and multiple edges, where each edge may connect a pair of nodes representing a pair of neighboring glyphs and may represent a glyph pair score corresponding to the pair of neighboring glyphs. More specifically, each node in the graph may be connected to at least one other node of the graph by a corresponding edge. Each node may represent a glyph in an image and each edge connecting two nodes may represent the glyph pair score corresponding to a neighboring glyph pair represented by the two connected nodes. The length of each edge, for example, may be indicative of the glyph pair score determined for the neighboring glyph pair represented by the two nodes connected by the edge.

At block 404, the candidate text line determination module(s) 128 may select a first glyph from a set of glyphs represented by corresponding nodes in the graph as a current glyph. At block 406, the candidate text line determination module(s) 128 may determine a neighboring glyph that together with the current glyph forms a glyph pair having the highest associated glyph pair score of any pair of neighboring glyphs that includes the current glyph. At block 408, the candidate text line determination module(s) 128 may determine that the glyph pair score associated with the glyph pair determined at block 406 satisfies one or more threshold values. For example, the candidate text line determination module(s) 128 may determine whether the glyph pair score satisfies a first threshold value and whether the glyph pair score satisfies a second threshold value greater than the first threshold value. The glyph pair score may be compared against the first threshold value to ensure that neither glyph in the glyph pair determined at block 406 is a background glyph in the image. The glyph pair score may be compared against the second threshold value to ensure that the glyph pair determined at block 406 is a suitable neighboring glyph pair for determining a candidate text line.

Upon determining that the glyph pair score satisfies the one or more threshold values, the candidate text line determination module(s) 128 may select the glyph pair as a current seed pair of neighboring glyphs at block 410. Then, at block 412, the candidate text line determination module(s) 128 may determine a node pair in the graph that corresponds to the current seed pair. More specifically, the candidate text line determination module(s) 128 may locate a first node in the graph corresponding to the current glyph. The candidate text line determination module(s) 128 may then locate an edge in the graph that is connected to the first node and that represents the highest glyph pair score associated with the first node. The candidate text line determination module(s) 128 may then determine a second node in the graph that is connected to the first node via the located edge. The first node and the second node may represent the current glyph and a neighboring glyph, respectively, forming part of a neighboring glyph pair having the highest associated glyph pair score among all neighboring glyph pairs that include the current glyph.

At block 414, the candidate text line determination module(s) 128 may traverse the graph to determine additional nodes corresponding to successive neighboring glyphs having the same orientation as the current seed pair of neighboring glyphs. More specifically, the candidate text line determination module(s) 128 may identify each additional node that is representative of a corresponding glyph that is aligned with an orientation of the current seed pair of neighboring glyphs.

Each such additional node may be directly connected to a first node of the node pair or a second node of the node pair via a corresponding edge or may be indirectly connected to the first node or the second node via one or more intervening additional nodes and corresponding edges. At block 416, the candidate text line determination module(s) 128 may select the current seed pair of neighboring glyphs and the glyphs corresponding to the additional nodes as a candidate text line.

At block 418, the candidate text line determination module(s) 128 may determine whether all glyphs in the set of glyphs have been selected. In response to a positive determination at block 418, the method 400 may end. In response to a negative determination at block 418, the candidate text line determination module(s) 128 may select a next glyph from the set of glyphs as the current glyph. The method 400 may then proceed iteratively from block 406 until a positive determination is made at block 418 and a complete set of candidate text lines is obtained.

Figure 5:
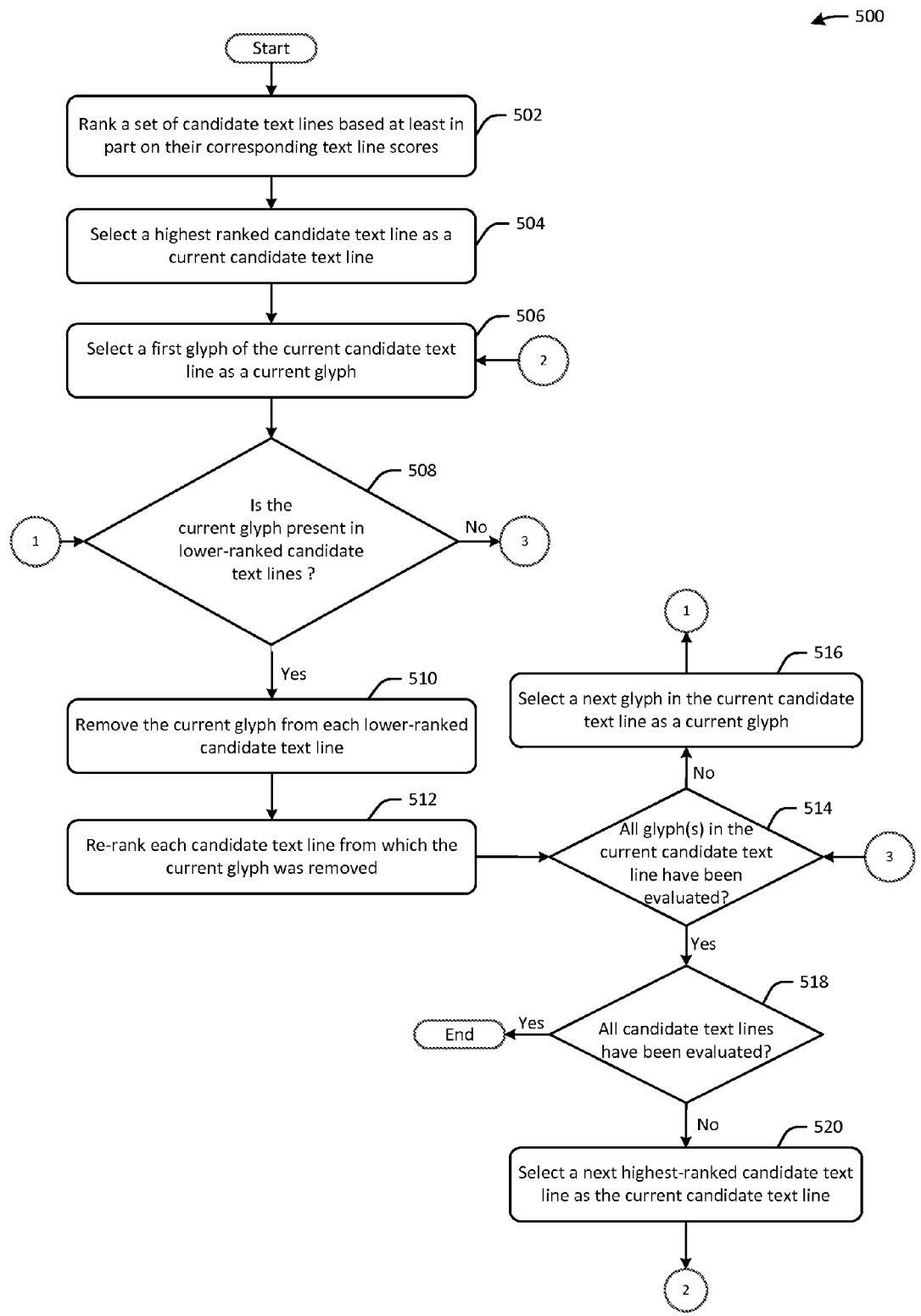
FIG. 5 is a process flow diagram of an illustrative method for ranking a set of candidate text lines in an image and determining a final set of text lines in the image based at least in part on the ranking in accordance with one or more example embodiments of the disclosure.

FIG. 5 is a process flow diagram of an illustrative method 500 for ranking a set of candidate text lines in an image and determining a final set of text lines in the image based on the ranking in accordance with one or more example embodiments of the disclosure.

At block 502, the candidate text line ranking module(s) 136 may rank a set of candidate text lines based at least in part on a set of text line feature values determined for each candidate text line. More specifically, the candidate text line ranking module(s) may generate a text line score for each candidate text line (e.g., a weighted combination of one or more text line feature values associated with the candidate text line) that indicates a likelihood that the candidate text line represents an actual text line in an image. The candidate text line ranking module(s) 136 may then rank the set of candidate text lines in accordance with their respective scores.

The operations at blocks 504-520 may represent an iterative series of operations that the conflict resolution module(s) 140 may perform to resolve any conflicts that may exist between the candidate text lines. As previously described, a conflict may exist if the same glyph is present in more than one distinct candidate text line. At block 504, the conflict resolution module(s) 140 may select a highest ranked candidate text line as a current candidate text line. At block 506, the conflict resolution module(s) 140 may select a first glyph of the current candidate text line as a current glyph.

At block 508, the conflict resolution module(s) 140 may determine whether the current glyph is present in lower-ranked candidate text lines. In response to a positive determination at block 508, the conflict resolution module(s) 140 may proceed to remove the current glyph from each lower-ranked candidate text line at block 510. Then, at block 512, the conflict resolution module(s) 140 may re-rank each candidate text line from which the current glyph was removed. More specifically, the candidate text line ranking module(s) 136 may determine a new set of text line features values for each modified candidate text line and may further determine a new text line score for each modified candidate text line based at least in part on the new set of text line features. The candidate text link ranking module(s) 136 may then update the ranking of each modified candidate text line based at least in part on the corresponding new text line score. It should be appreciated that set of candidate text lines having lower rankings than the current candidate text line may be iterated through to perform the operations at blocks 508-512.

From block 512, the method 500 may proceed to block 514. In addition, in response to a negative determination at block 508, the method 500 may also proceed to block 514. At block 514, the conflict resolution module(s) 140 may determine whether all glyphs in the current candidate text line have been evaluated. In response to a negative determination at block 514, the conflict resolution module(s) 140 may select a next glyph in the current candidate text line as the current glyph at block 516, and the method 500 may proceed iteratively from block 508.

On the other hand, in response to a positive determination at block 514, the method 500 may proceed to block 518 where the conflict resolution module(s) 140 may determine whether all candidate text lines have been evaluated. In response to a negative determination at block 518, the conflict resolution module(s) 140 may select a next highest-ranked candidate text line as the current candidate text line, and the method 500 may proceed iteratively from block 506. On the other hand, in response to a positive determination at block 518, the method 500 may end as all potential conflict in the set of candidate text lines have been resolved. At the completion of method 500, a final set of candidate text lines are obtained, each of which includes a unique combination of glyphs from the image. This final set of candidate text lines may be outputted by the multi-orientation text detection algorithm as a final set of actual text lines in the image.

Illustrative Device Architecture

Figure 6:
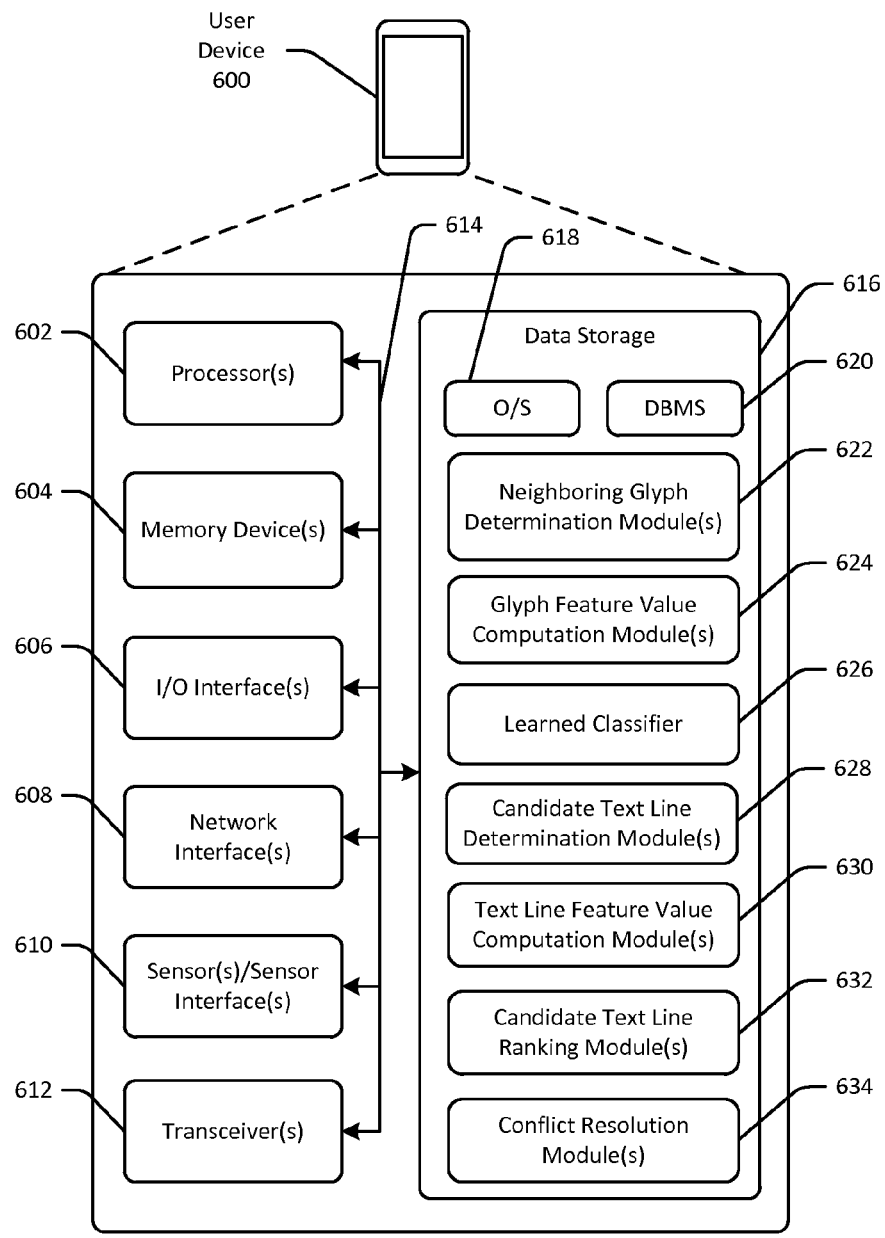
FIG. 6 is a schematic diagram of an illustrative device architecture in accordance with one or more example embodiments of the disclosure.

FIG. 6 is a schematic diagram of an illustrative device architecture in accordance with one or more example embodiments of the disclosure. A user device 600 is depicted. The user device 600 may include any of the example types of devices described in reference to the user device 100. The user device 600 may correspond to an illustrative device configuration for the user device 100.

In an illustrative configuration, the device 600 may include one or more processors (processor(s)) 602, one or more memory devices 604 (generically referred to herein as memory 604), one or more input/output ("I/O") interface(s) 606, one or more network interfaces 608, one or more sensors or sensor interfaces 610, one or more transceivers 612, and data storage 616. The device 600 may further include one or more buses 614 that functionally couple various components of the device 600. The device 600 may further include one or more antennas (not shown) that may include, without limitation, a cellular antenna, a Wi-Fi antenna, a Global Navigation Satellite System (GNSS) antenna, a Bluetooth antenna, an Near Field Communication (NFC) antenna, and so forth. These various components will be described in more detail hereinafter.

The bus(es) 614 may include at least one of a system bus, a memory bus, an address bus, or a message bus, and may permit exchange of information (e.g., data (including computer-executable code), signaling, etc.) between various components of the device 600. The bus(es) 614 may include, without limitation, a memory bus or a memory controller, a peripheral bus, an accelerated graphics port, and so forth. The bus(es) 614 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCM-CIA) architecture, a Universal Serial Bus (USB) architecture, and so forth.

The memory 604 of the device 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 616 may include removable storage and/or non-removable storage including, but not limited to, magnetic storage, optical disk storage, and/or tape storage. The data storage 616 may provide non-volatile storage of computer-executable instructions and other data. The memory 604 and the data storage 616, removable and/or non-removable, are examples of computer-readable storage media (CRSM) as that term is used herein.

The data storage 616 may store computer-executable code, instructions, or the like that may be loadable into the memory 604 and executable by the processor(s) 602 to cause the processor(s) 602 to perform or initiate various operations. The data storage 616 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 616 for non-volatile storage.

More specifically, the data storage 616 may store one or more operating systems (O/S) 618; one or more database management systems (DBMS) 620; and one or more program modules, applications, or the like such as, for example, one or more neighboring glyph determination modules 622, one or more glyph feature value computation modules 624, a learned classifier 626, one or more candidate text line determination modules 628, one or more text line feature value computation modules 630, one or more candidate text line ranking modules 632, and one or more conflict resolution modules 634. Any of the modules depicted in FIG. 6 may correspond in function to similarly named modules depicted in FIG. 1 and may include computer-executable code, instructions, or the like that may be loaded into the memory 604 for execution by one or more of the processor(s) 602. Further, any data stored in the data storage 616 may be loaded into the memory 604 for use by the processor(s) 602 in executing computer-executable code. In addition, any data potentially stored in one or more datastores may be accessed via the DBMS 620 and loaded in the memory 604 for use by the processor(s) 602 in executing computer-executable code.

The processor(s) 602 may be configured to access the memory 604 and execute computer-executable instructions loaded therein. For example, the processor(s) 602 may be configured to execute computer-executable instructions of the various program modules of the user device 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to other illustrative components depicted as being stored in the data storage 616, the O/S 618 may be loaded from the data storage 616 into the memory 604 and may provide an interface between other application software executing on the device 600 and hardware resources of the device 600. More specifically, the O/S 618 may include a set of computer-executable instructions for managing hardware resources of the device 600 and for providing common services to other application programs (e.g., managing memory allocation among various application programs). In certain example embodiments, the O/S 618 may control execution of one or more of the program modules depicted as being stored in the data storage 616. The O/S 618 may include any operating system now known or which may be developed in the future including, but not limited to, any server operating system, any mainframe operating system, or any other proprietary or non-proprietary operating system.

The DBMS 620 may be loaded into the memory 604 and may support functionality for accessing, retrieving, storing, and/or manipulating data stored in the memory 604 and/or data stored in the data storage 616. The DBMS 620 may use any of a variety of database models (e.g., relational model, object model, etc.) and may support any of a variety of query languages. The DBMS 620 may access data represented in one or more data schemas and stored in any suitable data repository. In those example embodiments in which the device 600 is a mobile device, the DBMS 620 may be any suitable light-weight DBMS optimized for performance on a mobile device. Datastore(s) stored in the data storage 616 and/or datastores external to the device 600 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the device 600, the input/output (I/O) interface(s) 606 may facilitate the receipt of input information by the device 600 from one or more I/O devices as well as the output of information from the device 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The device 600 may further include one or more network interfaces 608 via which the device 600 may communicate with any of a variety of other systems, platforms, networks, devices, and so forth. Such communication may occur via one or more networks including, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

Antenna(s) of the device 600 (not shown) may include any suitable type of antenna depending, for example, on the communications protocols used to transmit or receive signals via the antenna(s). Non-limiting examples of suitable antennas may include directional antennas, non-directional antennas, dipole antennas, folded dipole antennas, patch antennas, multiple-input multiple-output (MIMO) antennas, or the like. The antenna(s) may be communicatively coupled to one or more transceivers 612 or radio components to which or from which signals may be transmitted or received.

The transceiver(s) 612 may include any suitable radio component(s) for—in cooperation with the antenna(s)—transmitting or receiving radio frequency (RF) signals in the bandwidth and/or channels corresponding to the communications protocols utilized by the device 600 to communicate with other devices. The transceiver(s) 612 may include hardware, software, and/or firmware for modulating, transmitting, or receiving—potentially in cooperation with any of the antenna(s)—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the device 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program modules, applications, computer-executable instructions, code, or the like depicted in FIG. 6 as being stored in the data storage 616 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 600, and/or hosted on other computing device(s) accessible via one or more networks, may be provided to support functionality provided by the program modules, applications, or computer-executable code depicted in FIG. 6 and/or additional or alternate functionality. Further, functionality may be modularized differently such that processing described as being supported collectively by the collection of program modules depicted in FIG. 6 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 6 may be implemented, at least partially, in hardware and/or firmware across any number of devices.

It should further be appreciated that the device 600 may include alternate and/or additional hardware, software, or firmware components beyond those described or depicted without departing from the scope of the disclosure. More particularly, it should be appreciated that software, firmware, or hardware components depicted as forming part of the device 600 are merely illustrative and that some components may not be present or additional components may be provided in various embodiments. While various illustrative program modules have been depicted and described as software modules stored in data storage 616, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods 200-500 may have been described above as being performed by a device 100, or more specifically, by one or more engines, program modules, applications, or the like executable on a device, such as the device 600 having the illustrative configuration shown in FIG. 6. It should be appreciated, however, that such operations may be implemented in connection with numerous other device configurations.

The operations described and depicted in the illustrative methods of FIGS. 2-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
   determining a first glyph in an image, the first glyph including a first group of pixels corresponding to a first text character in the image;
   determining a second glyph in the image, the second glyph including a second group of pixels corresponding to a second text character in the image;
   determining a third glyph in the image, the third glyph including a third group of pixels corresponding to a third text character in the image;
   determining that the first glyph and the second glyph form a first pair of neighboring glyphs by determining that the second glyph is located within a first radius associated with the first glyph;
   determining that the first glyph and the third glyph form a second pair of neighboring glyphs by determining that the third glyph is located within the first radius of the first glyph;
   determining a first glyph pair score for the first pair of neighboring glyphs, the first glyph pair score indicating a likelihood that the first glyph and the second glyph are part of a first same text line in the image;
   determining a second glyph pair score for the second pair of neighboring glyphs, the second glyph pair score indicating a likelihood that the first glyph and the third glyph are part of a second same text line in the image;
   determining that the first glyph pair score is greater than the second glyph pair score;
   determining a first candidate text line having a first text orientation, wherein determining the first candidate text line includes determining that the first pair of neighboring glyphs is associated with the first orientation and determining that an additional glyph having the first text orientation is located within the first radius associated with the first glyph or within a second radius associated with the second glyph;
   determining a second candidate text line that includes the first glyph and the third glyph, the second candidate text line having a second text orientation; and
   determining that the first candidate text line corresponds to an actual text line having the first text orientation in the image, the actual text line including the first glyph, the second glyph, and the additional glyph.

2. The method of claim 1, wherein determining that the first candidate text line corresponds to the actual text line comprises:
   determining a first variance in a glyph feature between two or more glyphs of the first candidate text line, the glyph feature being a glyph height, a glyph stroke width, or a glyph color;
   determining a second variance in the glyph feature between two or more glyphs of the second candidate text line;
   determining that the first variance is less than the second variance;
   assigning a first ranking to the first candidate text line;
   assigning a second ranking to the second candidate text line, the first ranking being higher than the second ranking based on the first variance being less than the second variance; and
   selecting the first candidate text line as the actual text line based on the first ranking being higher than the second ranking.

3. The method of claim 2, wherein the actual text line is a first actual text line, the method further comprising:
   determining a third candidate text line that includes the third glyph and a fourth glyph;
   assigning a third ranking to the third candidate text line, the second ranking being higher than the third ranking;
   generating a fourth candidate text line by removing the first glyph from the second candidate text line based on the second ranking being lower than the first ranking;
   determining a fourth ranking for the fourth candidate text line;
   determining that the third ranking is higher than the fourth ranking; and
   determining that the third candidate text line is a second actual text line having the second text orientation in the image.

4. The method of claim 1, further comprising:
   determining a first glyph height of the first glyph when oriented in the first text orientation; and
   determining a second glyph height of the first glyph when oriented in the second text orientation,
   wherein the first glyph pair score is determined from the first glyph height and the second glyph pair score is determined from the second glyph height.

5. A method, comprising:
   determining a first glyph in an image;
   determining a second glyph in the image;
   determining a third glyph in the image;
   determining that the first glyph and the second glyph form a first pair of neighboring glyphs;
   determining that the first glyph and the third glyph form a second pair of neighboring glyphs;
   determining a first glyph pair score for the first pair of neighboring glyphs, wherein determining the first glyph pair score comprises determining a first value of a glyph pair feature for the first pair of neighboring glyphs;

determining a second glyph pair score for the second pair of neighboring glyphs, wherein determining the second glyph pair score comprises determining a second value of the glyph pair feature for the second pair of neighboring glyphs;

determining that the first glyph pair score is greater than the second glyph pair score;

determining a first candidate text line that includes at least the first glyph and the second glyph;

determining a second candidate text line that includes the first glyph and one or more additional glyphs;

determining a first value of a text line feature for the first candidate text line;

determining a second value of the text line feature for the second candidate text line; and determining, using the first value of the text line feature and the second value of the text line feature, that the first candidate text line corresponds to an actual text line in the image, the actual text line including the first glyph and the second glyph.

6. The method of claim 5, wherein the text line feature is a number of glyphs in a particular candidate text line or an average of a set of glyph pair scores associated with the particular candidate text line, each glyph pair score corresponding to a respective neighboring pair of glyphs in the particular candidate text line.

7. The method of claim 5, wherein determining the first value associated with the text line feature comprises determining a first variance in a glyph feature between two or more glyphs of the first candidate text line, the glyph feature being a glyph height, a glyph stroke width, or a glyph color, and wherein determining the second value associated with the text line feature comprises determining a second variance in the glyph feature between two or more glyphs of the second candidate text line.

8. The method of claim 5, further comprising:
determining a first ranking for the first candidate text line using the first value;
determining a second ranking for the second candidate text line using the second value;
determining that the first ranking is higher than the second ranking; and
selecting the first candidate text line as the actual text line in the image.

9. The method of claim 8, wherein the actual text line is a first actual text line having a horizontal orientation in the image, wherein the one or more additional glyphs of the second candidate text line comprise the third glyph, and wherein the second candidate text line has a vertical orientation in the image, the method further comprising:
determining a third candidate text line that includes the third glyph and a fourth glyph, the third candidate text line having the horizontal orientation in the image;
assigning a third ranking to the third candidate text line, the second ranking being higher than the third ranking;
generating a fourth candidate text line by removing the first glyph from the second candidate text line based on the second ranking being lower than the first ranking;
determining a fourth ranking for the fourth candidate text line;
determining that the third ranking is higher than the fourth ranking; and
determining that the third candidate text line is a second actual text line having the horizontal orientation in the image.

10. The method of claim 5, wherein determining that the first glyph and the second glyph form a first pair of neighboring glyphs comprises:
determining a first bounding box that encompasses the first glyph;
determining a second bounding box that encompasses the second glyph;
determining a first height of the first bounding box;
determining a first width of the first bounding box;
determining a first radius associated with the first glyph, the first radius being proportional to at least one of the first height or the first width;
determining a second height of the second bounding box;
determining a second width of the second bounding box;
determining a second radius associated with the second glyph, the second radius being proportional to at least one of the second height or the second width;
determining a distance between the first glyph and the second glyph; and
determining that the distance is at least one of: less than the first radius or less than the second radius.

11. The method of claim 5, wherein determining the first candidate text line comprises:
determining an orientation of the first pair of neighboring glyphs in the image;
determining a fourth glyph having the orientation in the image;
determining that the first glyph and the fourth glyph form a third pair of neighboring glyphs or that the second glyph and the fourth glyph form a fourth pair of neighboring glyphs; and
determining that the fourth glyph is part of the first candidate text line.

12. The method of claim 5, further comprising:
determining that the first glyph pair score satisfies a threshold value for determining whether a glyph is a text character;
determining that the second glyph pair score is greater than a respective glyph pair score for each pair of neighboring glyphs that includes the third glyph and a neighboring glyph to the third glyph other than the first glyph;
determining that the second glyph pair score does not satisfy the threshold value; and
determining that the third glyph corresponds to a symbol in the image that is not the text character.

13. The method of claim 5, wherein the glyph pair feature is an orientation-variant glyph pair feature.

14. A device, comprising:
at least one memory storing computer-executable instructions; and
at least one processor configured to access the at least one memory and execute the computer-executable instructions to:
determine a first glyph in an image;
determine a second glyph in the image;
determine a third glyph in the image;
determine that the first glyph and the second glyph form a first pair of neighboring glyphs;
determine that the first glyph and the third glyph form a second pair of neighboring glyphs;
determine a first glyph pair score for the first pair of neighboring glyphs at least in part by determining a first value of a glyph pair feature for the first pair of neighboring glyphs;
determine a second glyph pair score for the second pair of neighboring glyphs at least in part by determining a second value of the glyph pair feature for the second pair of neighboring glyphs;

determine that the first glyph pair score is greater than the second glyph pair score;

determine a first candidate text line that includes at least the first glyph and the second glyph;

determine a second candidate text line that includes the first glyph and one or more additional glyphs;

determine a first value of a text line feature for the first candidate text line;

determine a second value of the text line feature for the second candidate text line; and determine, using the first value of the text line feature and the second value of the text line feature, that the first candidate text line corresponds to an actual text line in the image, the actual text line including the first glyph and the second glyph.

15. The device of claim 14, wherein the text line feature is a number of glyphs in a particular candidate text line or an average of a set of glyph pair scores associated with the particular candidate text line, each glyph pair score corresponding to a respective neighboring pair of glyphs in the particular candidate text line.

16. The device of claim 14, wherein the at least one processor is configured to determine the first value associated with the text line feature by executing the computer-executable instructions to determine a first variance in a glyph feature between two or more glyphs of the first candidate text line, the glyph feature being a glyph height, a glyph stroke width, or a glyph color, and wherein the at least one processor is configured to determine the second value associated with the text line feature by executing the computer-executable instructions to determine a second variance in the glyph feature between two or more glyphs of the second candidate text line.

17. The device of claim 14, wherein the at least one processor is further configured to execute the computer-executable instructions to:

determine a first ranking for the first candidate text line using the first value;

determine a second ranking for the second candidate text line using the second value;

determine that the first ranking is higher than the second ranking; and select the first candidate text line as the actual text line in the image.

18. The device of claim 17, wherein the actual text line is a first actual text line having a horizontal orientation in the image, wherein the one or more additional glyphs of the second candidate text line comprise the third glyph, wherein the second candidate text line has a vertical orientation in the image, and wherein the at least one processor is further configured to execute the computer-executable instructions to:

determine a third candidate text line that includes the third glyph and a fourth glyph, the third candidate text line having the horizontal orientation in the image;

assign a third ranking to the third candidate text line, the second ranking being higher than the third ranking;

determine a fourth candidate text line by removing the first glyph from the second candidate text line based on the second ranking being lower than the first ranking;

determine a fourth ranking for the fourth candidate text line;

determine that the third ranking is higher than the fourth ranking; and determine that the third candidate text line is a second actual text line having the horizontal orientation in the image.

19. The device of claim 14, wherein the at least one processor is configured to determine that the first glyph and the second glyph form a first pair of neighboring glyphs by executing the computer-executable instructions to:

determine a first bounding box that encompasses the first glyph;

determine a second bounding box that encompasses the second glyph;

determine a first height of the first bounding box;

determine a first width of the first bounding box;

determine a first radius associated with the first glyph, the first radius being proportional to at least one of the first height or the first width;

determine a second height of the second bounding box;

determine a second width of the second bounding box;

determine a second radius associated with the second glyph, the second radius being proportional to at least one of the second height or the second width;

determine a distance between the first glyph and the second glyph; and determine that the distance is at least one of: less than the first radius or less than the second radius.

20. The device of claim 14, wherein the at least one processor is configured to determine the first candidate text line by executing the computer-executable instructions to:

determine an orientation of the first pair of neighboring glyphs in the image;

determine a fourth glyph having the orientation in the image;

determine that the first glyph and the fourth glyph form a third pair of neighboring glyphs or that the second glyph and the fourth glyph form a fourth pair of neighboring glyphs; and determine that the fourth glyph is part of the first candidate text line.

* * * * *